(12) United States Patent
Le Bouar et al.

(10) Patent No.: US 9,194,333 B2
(45) Date of Patent: Nov. 24, 2015

(54) TURBOPUMP

(71) Applicant: SNECMA, Paris (FR)

(72) Inventors: Gaelle Le Bouar, Saint-Marcel (FR); Richard Petit, Rouen (FR)

(73) Assignee: SNECMA, Paris (FR)

( * ) Notice: Subject to any disclaimer, the term of this patent is extended or adjusted under 35 U.S.C. 154(b) by 15 days.

(21) Appl. No.: 13/904,394

(22) Filed: May 29, 2013

(65) Prior Publication Data

US 2013/0323081 A1     Dec. 5, 2013

(30) Foreign Application Priority Data

Jun. 1, 2012   (FR) ...................... 12 55095

(51) Int. Cl.
*F02K 9/48*   (2006.01)
*F04D 15/00*  (2006.01)
*F02K 9/56*   (2006.01)

(52) U.S. Cl.
CPC . *F02K 9/48* (2013.01); *F02K 9/563* (2013.01); *F04D 15/0066* (2013.01)

(58) Field of Classification Search
CPC ............... F02K 9/44; F02K 9/46; F02K 9/48; F02K 9/50; F02K 9/58; F02K 9/64; F02K 3/115; Y10S 60/915; F05D 2260/902; F05D 2260/903; F05D 2260/904; F05D 2260/90; F01D 21/006
USPC .............................. 60/257–260, 266, 267, 915
See application file for complete search history.

(56) References Cited

U.S. PATENT DOCUMENTS

| | | | | |
|---|---|---|---|---|
| 2,465,526 | A |    | 3/1949  | Goddard et al. |
| 2,986,221 | A | * | 5/1961  | Liaaen ............................ 416/32 |
| 3,013,388 | A | * | 12/1961 | Loughran .................. 60/39.462 |
| 3,077,073 | A |    | 2/1963  | Kuhrt |
| 3,357,191 | A | * | 12/1967 | Berner ........................... 60/269 |
| 4,583,362 | A | * | 4/1986  | Wagner .......................... 60/259 |
| 4,771,600 | A |    | 9/1988  | Limerick et al. |
| 4,879,874 | A | * | 11/1989 | Koyari et al. ................... 60/259 |
| 8,047,770 | B2 | * | 11/2011 | Braicks ........................ 415/123 |
| 2008/0256925 | A1 | * | 10/2008 | Pederson et al. ............... 60/258 |
| 2009/0028693 | A1 | * | 1/2009  | Takahashi et al. ............ 415/123 |
| 2010/0300065 | A1 |    | 12/2010 | Balepin |
| 2012/0167552 | A1 | * | 7/2012  | Mori et al. ...................... 60/258 |

OTHER PUBLICATIONS

Sutton et al, "Rocket Propulsion Elements" 2001, John Wiley and Sons, 7th edition, pp. 221-228, 400-402.*
French Preliminary Search Report issued Mar. 11, 2013, in French Application No. 12 55095 filed Jun. 1, 2012 (with English Translation of Categories of Cited Documents).

* cited by examiner

*Primary Examiner* — Ted Kim
(74) *Attorney, Agent, or Firm* — Oblon, McClelland, Maier & Neustadt, L.L.P.

(57) ABSTRACT

The invention relates to a field of feeding reaction engines, and in particular a turbopump 9 for feeding at least one combustion chamber 2 with a first propellant, the turbopump comprising a pump 9a, a turbine 9b to the pump 9a in order to drive it, and a variable and/or disengageable braking device 11.

13 Claims, 1 Drawing Sheet

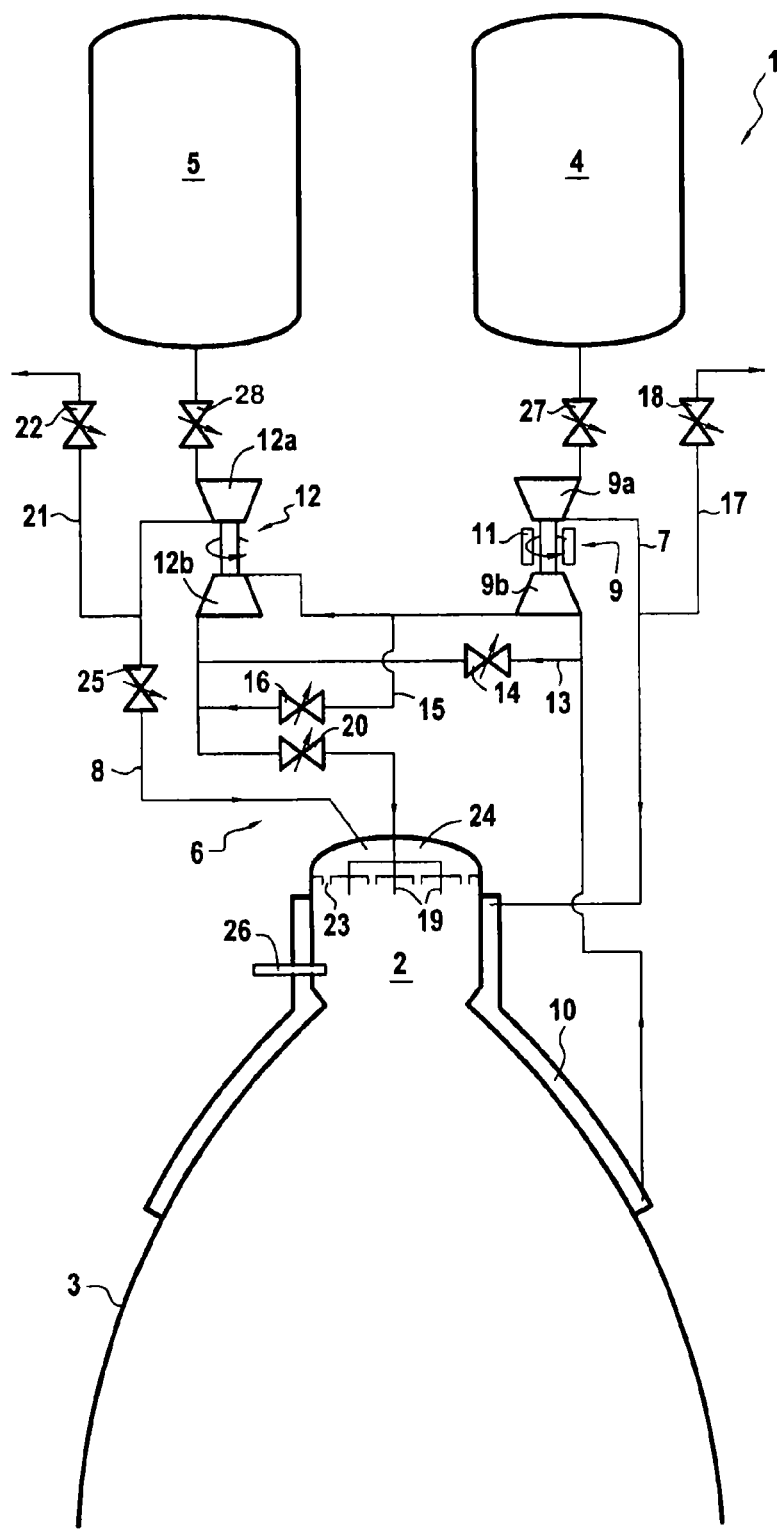

TURBOPUMP

BACKGROUND OF THE INVENTION

The present invention relates to the field of feeding at least one combustion chamber with at least one propellant.

In the description below, the terms "upstream" and "downstream" are defined relative to the normal flow direction of a propellant in a feed circuit.

In reaction engines, and in particular in rocket engines, thrust is typically generated by hot combustion gas that is produced by an exothermal chemical reaction that has taken place within a combustion chamber and that expands in a propulsive nozzle. Consequently, high pressures normally exist in the combustion chamber while it is in operation. In order to be able to continue to feed the combustion chamber in spite of those high pressures, propellants need to be introduced at pressures that are even higher. Various means are known in the prior art for achieving this.

First means that have been proposed comprise pressurizing the tank containing the propellants. Nevertheless, that approach greatly restricts the maximum pressure that can be reached in the combustion chamber and thus restricts the specific impulse of the reaction engine. Consequently, in order to reach higher specific impulses, the use of feed pumps has become common practice. Various means have been proposed for actuating such pumps, and most frequently they are driven by at least one turbine. In such a turbopump, the turbine itself may be actuated in various different ways. For example, the turbine may be actuated by combustion gas produced by a gas generator. Nevertheless, in so-called "expander cycle" rocket engines, the turbine is actuated by one of the propellants after it has passed through a heat exchanger in which it is heated by the heat produced in the combustion chamber. Thus, this transfer of heat can contribute simultaneously to cooling the walls of the combustion chamber and/or of the propulsive nozzle, while also actuating at least one feed pump.

Typically, propellant feed circuits are arranged to reach an operating equilibrium in which a specific flow rate of each propellant is delivered to the combustion chamber. Consequently, a rocket engine fed by such feed circuits reaches a stable level of thrust. Nevertheless, under certain circumstances, it may be desirable to be able to select between a plurality of stable levels of thrust. In particular, it is now desired for the rocket engines of the final stages of satellite launchers to have not only a function of putting the payload into orbit, but also a function of de-orbiting the final stage. In order to perform such de-orbiting, and in particular in order to ensure that the final stage falls at an accurate point, it is preferable to make use of a level of thrust that is substantially smaller than the level of thrust used while putting the payload into orbit.

In the survey "Design and analysis report of the RL 10-IIB breadboard low thrust engine", FR-18046-3, written for NASA on Dec. 12, 1984, a system for feeding propellant to a combustion chamber is proposed that is capable of obtaining a low-thrust mode by opening a passage for bypassing the turbine that drives the pumps for the two propellants. Nevertheless, that solution requires additional complication in the propellant feed circuit, in particular to the detriment of their reliability.

OBJECT AND SUMMARY OF THE INVENTION

The present invention seeks to remedy those drawbacks. In particular, the invention seeks to propose a feed device that enables the rate at which propellant is delivered to a combustion chamber to be controlled without leading to additional complication of the propellant feed circuits.

In at least one embodiment, this object is achieved by the fact that, in a turbopump for feeding at least one combustion chamber with a first propellant, and including at least a first pump and a first turbine coupled to be driven by the first pump, there is also a variable and/or disengageable braking device.

By means of the braking device, it is possible to apply a braking torque to the turbopump while its speed is rising in order to restrict the flow rate at which propellant is delivered to the combustion chamber. The speed of the engine can thus be stabilized at a low level of thrust.

In particular, the braking device may be an electromagnetic braking device, a friction braking device, or a hydrodynamic braking device. If the braking device is electromagnetic, it may for example be a device of the type that makes use of eddy currents induced in a rotor in order to generate a braking torque. If the braking device is a friction braking device, it may for example be of the type having a friction pad actuated by an actuator or a device having mechanical jaws. A hydrodynamic braking device may for example comprise an inverse Pelton turbine.

The present invention also provides a feed circuit for feeding at least one combustion chamber with a first propellant, and in particular a circuit having at least a first turbopump comprising at least a first pump and a first turbine coupled to the first pump in order to drive it, a variable and/or disengageable braking device, and a heat exchanger situated downstream from the first pump and upstream from the first turbine and suitable for heating a flow of the first propellant between the first pump and the first turbine by using heat generated in said combustion chamber. In particular, the second turbine may be situated downstream from the first turbine. Thus, the feed circuit is a circuit of the so-called "expander" type making use of this transfer of heat to the first propellant simultaneously for cooling the walls of the combustion chamber and/or of the propulsive nozzle, and also for actuating at least the first turbopump.

In order to contribute to controlling the first turbopump, the circuit may also include a passage for bypassing at least the first turbine, which passage is fitted with a first bypass valve, thus enabling the first turbopump to be bypassed in selective manner.

The present invention also provides a feed system for feeding at least one combustion chamber with propellants, the system comprising at least a first circuit for feeding the at least one combustion chamber with a first propellant, a second circuit for feeding the at least one combustion chamber with a second propellant, and a second turbopump comprising at least a second pump situated in the second circuit and a second turbine situated in the first circuit and coupled to the second pump in order to drive it. In this way, the feed system can deliver two propellants under pressure to the combustion chamber, the flow rates of the two propellants being variable simultaneously as a function of the braking torque applied to the first turbopump by its braking device.

Nevertheless, in order to contribute to controlling the second turbopump, the first circuit may also include a passage bypassing the second turbine and fitted with a second bypass valve, thus enabling the second turbopump to be bypassed selectively.

The invention also provides a method of controlling a combustion chamber. In particular, in a method in at least one implementation, the combustion chamber is fed with a first propellant by a first turbopump comprising at least a first pump, a first turbine coupled to the first pump in order to drive it, and a variable and/or disengageable braking device, and a braking torque is applied to the first turbopump by its braking device in order to restrict the speed of the turbopump and thus restrict the flow rate delivered by the turbopump to the combustion chamber.

BRIEF DESCRIPTION OF THE DRAWING

The invention can be well understood and its advantages appear better on reading the following detailed description of an embodiment given by way of non-limiting example. The description refers to the accompanying FIGURE, which is a diagram showing a rocket engine with a propellant feed system in this embodiment of the present invention.

DETAILED DESCRIPTION OF THE INVENTION

The rocket engine 1 shown in the accompanying FIGURE has a combustion chamber 2 with a diverging nozzle 3, tanks 4, 5, and a system 6 for feeding the combustion chamber 2 with propellants coming from the tanks 4, 5. The tank 4 contains a first propellant and the tank 5 contains a second propellant. In particular, in the embodiment shown, the tanks 4, 5 may be cryogenic tanks containing respectively liquid hydrogen and liquid oxygen.

The feed system 6 has a first circuit 7 for the first propellant and a second circuit 8 for the second propellant. The first circuit 7 is connected to the tank 4 via a valve 27 and includes a first turbopump 9 and a regenerative heat exchanger 10 incorporated in the walls of the combustion chamber 2. The first turbopump 9 comprises a first pump 9a and a first turbine 9b coupled to the first pump 9a in order to actuate it, together with an electromagnetic, friction, and/or hydrodynamic braking device 11 for applying a braking torque $T_{brake}$ to the turbopump 9. The first circuit 7 is configured in such a manner that the heat exchanger 10 is situated downstream from the first pump 9a and upstream from the first turbine 9b. A second turbine 12b is also situated downstream from the first turbine 9b in this first circuit 7. This second turbine 12b is coupled to a second pump 12a in order to actuate it, said second pump 12a being situated in the second circuit 8 for pumping the second propellant. Together, the second pump 12a and the second turbine 12b form a second turbopump 12. The first circuit 7 also includes a passage 13 bypassing both turbines 9b and 12b, which passage is fitted with a first bypass valve 14, and the first circuit 7 also has a passage 15 bypassing the second turbine 12b and fitted with a second bypass valve 16. Directly downstream from the first pump 9a, the first circuit 7 also has a branch connection leading to a blow-off line 17 for the first propellant and including a first propellant blow-off valve 18. Directly upstream from the injectors 19 for injecting the first propellant into the combustion chamber 2, the first circuit 7 also has a valve 20 for admitting the first propellant into the combustion chamber 2.

The second circuit 8, which is connected to the tank 5 via a valve 28, also includes a branch connection downstream from the second pump 12a to a line 21 for blowing off the second propellant, with a second propellant blow-off valve 22. The second circuit 8 leads to the injectors 23 for injecting the second propellant into the combustion chamber 2 via a dome 24 covering the combustion chamber 2. Directly upstream from the dome 24, the second circuit 8 also has a valve 25 for admitting the second propellant into the combustion chamber 2. The combustion chamber 2 also has an ignitor 26. The braking device 11, the valves 14, 16, 18, 20, 22, 25, 27, and 28, and the ignitor 26 are all connected to a control unit (not shown) in order to control the operation of the rocket engine 1.

Prior to igniting the rocket engine 1, the valves 27 and 28 are initially opened to admit the propellants into the circuits 7 and 8 and to cool the circuits down. During this cooling, the blow-off valves 18 and 20 remain open, as do the bypass valves 14 and 16. Once the circuits 7 and 8 have been cooled, the valves 20 and 25 are opened to admit the two propellants into the combustion chamber 2. The ignitor 26 is then activated in order to ignite the mixture of propellants in the combustion chamber 2. Once ignition has occurred, the heat exchanger 10 begins to heat the flow of the first propellant that passes therethrough. The blow-off valves 18 and 22 and the bypass valves 14 and 16 can then be closed progressively in order to enable the speed of the turbopumps 9 and 12 to increase. During this increase in speed, an increasing flow of the first propellant, as heated in the heat exchanger 10, actuates the turbines 9b and 12b before being injected into the combustion chamber 2 via the injectors 19. In turn, the turbines 9b and 12b activate the pumps 9a and 12a respectively, thereby increasing the flow rates of both propellants during this period of increasing speed.

The rise in speed of the first turbopump 9 is governed by the following equation:

$$I\frac{d\omega}{dt} = T_{turbine} - T_{pump} - T_{brake}$$

where I represents the inertia of the turbopump 9, $\omega$ represents its speed of rotation, $T_{turbine}$ represents the torque generated by the expansion of the first propellant in the first turbine 9b, and $T_{pump}$ represents the torque consumed by the first pump 9a in order to pump the first propellant. At the end of this rise in speed, the first turbopump 9 reaches equilibrium in which the torque $T_{turbine}$ generated by the first turbine 9b is equal to the sum of the torque $T_{pump}$ consumed by the first pump 9a plus the braking torque $T_{brake}$ from the braking device 11. Since the braking device 11 is variable and/or disengageable, it is thus possible to control the speed at which the first turbopump 9 reaches its operating equilibrium. Indirectly, this also affects the operating equilibrium of the second turbopump 12, with the torque generated by the second turbine 12b depending on the flow rate of the first propellant pumped by the first pump 9a. By means of the braking device 11, it is thus possible to control the rocket engine 1 so as to obtain different levels of thrust.

Although the present invention is described above with reference to a specific embodiment, it is clear that various modifications and changes may be applied thereto without going beyond the general scope of the invention as defined by the claims. In addition, the individual characteristics of the various embodiments mentioned may be combined in additional embodiments. Consequently, the description and the drawings should be considered as being illustrative rather than restrictive.

What is claimed is:
1. A feed circuit for feeding at least one combustion chamber with a first propellant, the circuit comprising:
   a first turbopump comprising:
      a first pump for pumping a flow of the first propellant;
      a first turbine, driven by the flow of the first propellant and coupled to the first pump in order to drive the first pump; and a variable and/or disengageable braking device which applies a braking torque to the first turbopump so as to control a speed at which the first turbopump reaches operating equilibrium during a rise in speed; and a heat exchanger situated downstream from the first pump and upstream from the first turbine for heating a flow of the first propellant between the first pump and the first turbine by using heat generated in said combustion chamber, wherein at an end of the rise in speed, the operating equilibrium of the first turbopump is reached when a torque generated by the first turbine is equal to a sum of a torque consumed by the first pump and the braking torque applied by the braking device to the first turbopump, wherein a selective application of the braking device allows the first turbopump to operate at multiple speeds that achieves a selective plurality of thrust levels.

2. A circuit according to claim 1, further including a bypass passage for bypassing at least the first turbine and fitted with a first bypass valve.

3. A feed circuit according to claim 1, wherein said braking device of the first turbopump is an electromagnetic braking device.

4. A feed circuit according to claim 1, wherein said braking device of the first turbopump is a friction braking device.

5. A feed circuit according to claim 1, wherein said braking device of the first turbopump is a hydrodynamic braking device.

6. A system for feeding at least one combustion chamber with propellants, the system comprising:
   a first circuit for feeding the at least one combustion chamber with a first propellant and comprising:
      a first turbopump comprising:
         a first pump for pumping a flow of the first propellant;
         a first turbine, driven by the flow of the first propellant and coupled to the first pump in order to drive the first pump; and
         a variable and/or disengageable braking device which applies a braking torque to the first turbopump so as to control a speed at which the first turbopump reaches operating equilibrium during a rise in speed; and
      a heat exchanger situated downstream from the first pump and upstream from the first turbine for heating the flow of the first propellant between the first pump and the first turbine by using heat generated in said combustion chamber;
   a second circuit for feeding the at least one combustion chamber with a second propellant; and
   a second turbopump comprising:
      a second pump situated in the second circuit for pumping a flow of the second propellant; and
      a second turbine situated in the first circuit, so as to be driven by the flow of the first propellant, and coupled to the second pump in order to drive the second pump, wherein at an end of the rise in speed, the operating equilibrium of the first turbopump is reached when a torque generated by the first turbine is equal to a sum of a torque consumed by the first pump and the braking torque applied by the braking device to the first turbopump, wherein a selective application of the braking device allows the first turbopump to operate at multiple speeds that achieves a selective plurality of thrust levels.

7. A system according to claim 6, wherein the first circuit also includes a bypass passage for bypassing the second turbine and fitted with a second bypass valve.

8. A system according to claim 6, wherein the second turbine is situated downstream from the first turbine in the first circuit.

9. A system according to claim 6, wherein said first circuit further includes a bypass passage for bypassing at least the first turbine and fitted with a first bypass valve.

10. A system according to claim 6, wherein said braking device for braking the first turbopump is an electromagnetic braking device.

11. A system according to claim 6, wherein said braking device for braking the first turbopump is a friction braking device.

12. A system according to claim 6, wherein said braking device for braking the first turbopump is a hydrodynamic braking device.

13. A method of controlling a combustion chamber fed with a first propellant by a first turbopump comprising a first pump for pumping a flow of the first propellant; a first turbine, driven by the flow of the first propellant after the first propellant has been heated, between the first pump and the first turbine, using heat generated in said combustion chamber, the first turbine being coupled to drive the first pump; and a variable and/or disengageable braking device, the method comprising:
   applying a braking torque to said first turbopump by the braking device during a rise in speed of the turbopump in order to restrict a flow rate of propellant delivered to the combustion chamber so as to control the speed that said first turbopump reaches in operating equilibrium, wherein at an end of the rise in speed, the operating equilibrium of the first turbopump is reached when a torque generated by the first turbine is equal to a sum of a torque consumed by the first pump and the braking torque applied by the braking device to the first turbopump, wherein a selective application of the braking device allows the first turbopump to operate at multiple speeds that achieves a selective plurality of thrust levels.

* * * * *